United States Patent
Ramprasad et al.

(10) Patent No.: US 10,368,215 B2
(45) Date of Patent: *Jul. 30, 2019

(54) HYBRID NETWORK BASED METERING SERVER AND TRACKING CLIENT FOR WIRELESS SERVICES

(71) Applicant: TracFone Wireless, Inc., Miami, FL (US)

(72) Inventors: Satish Ramprasad, Miami, FL (US); Sergio Rivera, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/011,844

(22) Filed: Jun. 19, 2018

(65) Prior Publication Data

US 2018/0302764 A1 Oct. 18, 2018

Related U.S. Application Data

(63) Continuation of application No. 15/488,783, filed on Apr. 17, 2017, now Pat. No. 10,003,947, which is a (Continued)

(51) Int. Cl.
*H04W 4/24* (2018.01)
*H04W 12/12* (2009.01)
(Continued)

(52) U.S. Cl.
CPC ............. *H04W 4/24* (2013.01); *H04L 12/141* (2013.01); *H04L 12/1414* (2013.01);
(Continued)

(58) Field of Classification Search
CPC ............... H04M 15/852; H04M 15/28; H04M 2215/32; H04W 4/24; G06F 3/0481; H04L 12/1467; H04L 12/1435; H04L 12/141
(Continued)

(56) References Cited

U.S. PATENT DOCUMENTS 6,990,182 B2   1/2006   Nelson
7,088,995 B2   8/2006   Rao
(Continued)

OTHER PUBLICATIONS

Copeland et al.: "Resolving Ten MVNO Issues with EPS Architecture, VoLTE and Advanced Policy Server," Intelligence in Next Generation Networks (ICIN), Oct. 2011, pp. 29-34.
(Continued)

*Primary Examiner* — Phuoc H Doan
(74) *Attorney, Agent, or Firm* — BakerHostetler (57) ABSTRACT

A process of tracking usage of a wireless device in a third party wireless network with a metering system includes implementing the metering system in a network separate from the third party wireless network and activating the wireless device in response to identification of the wireless device and confirmation of use of a tracking system to the metering system. The process further includes obtaining, by the metering system, an amount of wireless services used by the wireless device. The obtaining includes at least one of obtaining an amount of wireless services used from the third party wireless network and obtaining an amount of wireless services used from the tracking system.

20 Claims, 4 Drawing Sheets

Related U.S. Application Data continuation of application No. 14/955,881, filed on Dec. 1, 2015, now Pat. No. 9,628,978, which is a continuation of application No. 14/457,583, filed on Aug. 12, 2014, now Pat. No. 9,204,281, which is a continuation of application No. 13/669,838, filed on Nov. 6, 2012, now Pat. No. 8,805,323.

(51) Int. Cl.
    *H04M 15/28*      (2006.01)
    *H04M 15/30*      (2006.01)
    *H04M 15/00*      (2006.01)
    *H04L 12/14*      (2006.01)
    *H04W 48/02*      (2009.01)

(52) U.S. Cl.
    CPC ...... *H04L 12/1435* (2013.01); *H04L 12/1439* (2013.01); *H04M 15/28* (2013.01); *H04M 15/30* (2013.01); *H04M 15/55* (2013.01); *H04M 15/58* (2013.01); *H04M 15/61* (2013.01); *H04W 12/12* (2013.01); *H04W 48/02* (2013.01); *H04L 12/1467* (2013.01); *H04M 2215/32* (2013.01)

(58) Field of Classification Search
    USPC .............. 455/575.2, 405; 370/331; 705/34; 340/572.1; 379/130
    See application file for complete search history.

(56) References Cited

U.S. PATENT DOCUMENTS

| | | | |
|---|---|---|---|
| 7,123,703 B2 | 10/2006 | Hausmann et al. | |
| 7,203,478 B2 | 4/2007 | Benco et al. | |
| 7,310,415 B1 * | 12/2007 | Short | H04M 15/00 379/130 |
| 7,885,654 B2 | 2/2011 | Fadell | |
| 8,023,425 B2 | 9/2011 | Raleigh | |
| 8,107,921 B2 | 1/2012 | Fiatal | |
| 8,229,812 B2 | 7/2012 | Raleigh | |
| 8,250,207 B2 | 8/2012 | Raleigh | |
| 8,270,310 B2 | 9/2012 | Raleigh | |
| 8,270,952 B2 | 9/2012 | Raleigh | |
| 8,275,830 B2 | 9/2012 | Raleigh | |
| 8,321,526 B2 | 11/2012 | Raleigh | |
| 8,326,958 B1 | 12/2012 | Raleigh | |
| 8,331,901 B2 | 12/2012 | Raleigh | |
| 8,340,634 B2 | 12/2012 | Raleigh | |
| 8,346,225 B2 | 1/2013 | Raleigh | |
| 8,351,898 B2 | 1/2013 | Raleigh | |
| 8,355,337 B2 | 1/2013 | Raleigh | |
| 8,385,916 B2 | 2/2013 | Raleigh | |
| 8,391,834 B2 | 3/2013 | Raleigh | |
| 8,396,458 B2 | 3/2013 | Raleigh | |
| 8,402,111 B2 | 3/2013 | Raleigh | |
| 8,406,733 B2 | 3/2013 | Raleigh | |
| 8,406,748 B2 | 3/2013 | Raleigh et al. | |
| 8,437,271 B2 | 5/2013 | Raleigh | |
| 8,441,989 B2 | 5/2013 | Raleigh | |
| 8,467,312 B2 | 6/2013 | Raleigh | |
| 8,478,667 B2 | 7/2013 | Raleigh | |
| 8,516,552 B2 | 8/2013 | Raleigh | |
| 8,521,129 B2 | 8/2013 | Gudlavenkatasiva et al. | |
| 8,527,630 B2 | 9/2013 | Raleigh et al. | |
| 8,531,986 B2 | 9/2013 | Raleigh | |
| 8,547,872 B2 | 10/2013 | Raleigh | |
| 8,548,428 B2 | 10/2013 | Raleigh | |
| 2003/0125012 A1 | 7/2003 | Allen et al. | |
| 2003/0126095 A1 | 7/2003 | Allen | |
| 2003/0135582 A1 | 7/2003 | Allen et al. | |
| 2004/0148343 A1 | 7/2004 | Mottes | |
| 2004/0162058 A1 | 8/2004 | Mottes | |
| 2005/0080875 A1 | 4/2005 | Jethi et al. | |
| 2007/0147297 A1 * | 6/2007 | Diaz | H04W 16/18 370/331 |
| 2007/0281663 A1 | 12/2007 | Sandholm et al. | |
| 2009/0293019 A1 | 11/2009 | Raffel et al. | |
| 2010/0031157 A1 | 2/2010 | Neer et al. | |
| 2010/0114687 A1 | 5/2010 | Zamora et al. | |
| 2010/0188991 A1 | 7/2010 | Raleigh | |
| 2010/0188992 A1 | 7/2010 | Raleigh | |
| 2010/0188993 A1 | 7/2010 | Raleigh | |
| 2010/0188995 A1 | 7/2010 | Raleigh | |
| 2010/0190470 A1 | 7/2010 | Raleigh | |
| 2010/0191612 A1 | 7/2010 | Raleigh | |
| 2010/0191846 A1 | 7/2010 | Raleigh | |
| 2010/0191847 A1 | 7/2010 | Raleigh | |
| 2010/0192170 A1 | 7/2010 | Raleigh | |
| 2010/0192207 A1 | 7/2010 | Raleigh | |
| 2010/0192212 A1 | 7/2010 | Raleigh | |
| 2010/0330957 A1 | 12/2010 | Harada et al. | |
| 2011/0130140 A1 | 6/2011 | Fadell | |
| 2011/0244839 A1 | 10/2011 | Poltorak | |
| 2011/0264726 A1 | 10/2011 | Zabawskyj et al. | |
| 2011/0294463 A1 | 12/2011 | Fiatal | |
| 2011/0294464 A1 | 12/2011 | Fiatal | |
| 2011/0314145 A1 | 12/2011 | Raleigh et al. | |
| 2012/0084184 A1 | 4/2012 | Raleigh et al. | |
| 2012/0084438 A1 | 4/2012 | Raleigh et al. | |
| 2012/0087319 A1 | 4/2012 | Raleigh et al. | |
| 2012/0088470 A1 | 4/2012 | Raleigh | |
| 2012/0089727 A1 | 4/2012 | Raleigh et al. | |
| 2012/0096513 A1 | 4/2012 | Raleigh et al. | |
| 2012/0101952 A1 | 4/2012 | Raleigh et al. | |
| 2012/0134291 A1 | 5/2012 | Raleigh | |
| 2012/0167162 A1 | 6/2012 | Raleigh et al. | |
| 2012/0197792 A1 | 8/2012 | Raleigh | |
| 2012/0201133 A1 | 8/2012 | Raleigh | |
| 2012/0203677 A1 | 8/2012 | Raleigh | |
| 2012/0215911 A1 | 8/2012 | Raleigh et al. | |
| 2012/0221955 A1 | 8/2012 | Raleigh et al. | |
| 2012/0278722 A1 | 11/2012 | Raleigh et al. | |
| 2012/0289147 A1 | 11/2012 | Raleigh et al. | |
| 2012/0297055 A9 | 11/2012 | Raleigh | |
| 2012/0310804 A1 | 12/2012 | Raleigh et al. | |
| 2012/0324091 A9 | 12/2012 | Raleigh et al. | |
| 2012/0327787 A1 | 12/2012 | Mohammed et al. | |
| 2012/0329425 A1 | 12/2012 | Velusamy et al. | |
| 2012/0330829 A1 | 12/2012 | Raleigh | |
| 2013/0003613 A1 | 1/2013 | Raleigh | |
| 2013/0005299 A1 | 1/2013 | Raleigh | |
| 2013/0005322 A1 | 1/2013 | Raleigh | |
| 2013/0006729 A1 | 1/2013 | Raleigh | |
| 2013/0006780 A1 | 1/2013 | Raleigh | |
| 2013/0040703 A1 | 2/2013 | Raleigh | |
| 2013/0045710 A1 | 2/2013 | Raleigh | |
| 2013/0065551 A1 | 3/2013 | Raleigh et al. | |
| 2013/0065553 A1 | 3/2013 | Raleigh | |
| 2013/0065578 A1 | 3/2013 | Raleigh et al. | |
| 2013/0072149 A1 | 3/2013 | Raleigh | |
| 2013/0080607 A1 | 3/2013 | Raleigh | |
| 2013/0096998 A1 | 4/2013 | Raleigh | |
| 2013/0102278 A1 | 4/2013 | Raleigh | |
| 2013/0107706 A1 | 5/2013 | Raleigh | |
| 2013/0109378 A1 | 5/2013 | Raleigh | |
| 2013/0125219 A1 | 5/2013 | Raleigh | |
| 2013/0132578 A1 | 5/2013 | Raleigh | |
| 2013/0132854 A1 | 5/2013 | Raleigh et al. | |
| 2013/0133028 A1 | 5/2013 | Raleigh | |
| 2013/0145422 A1 | 6/2013 | Raleigh | |
| 2013/0178188 A1 | 7/2013 | Judkins et al. | |
| 2013/0196621 A1 | 8/2013 | Guday et al. | |
| 2013/0196622 A1 | 8/2013 | Zalmanovitch et al. | |
| 2013/0196647 A1 | 8/2013 | Raleigh et al. | |
| 2013/0215795 A1 | 8/2013 | Raleigh | |
| 2013/0227659 A1 | 8/2013 | Raleigh | |
| 2013/0229951 A1 | 9/2013 | Raleigh | |
| 2013/0231084 A1 | 9/2013 | Raleigh | |
| 2013/0235766 A1 | 9/2013 | Raleigh | |
| 2013/0238751 A1 | 9/2013 | Raleigh et al. | |
| 2013/0238761 A1 | 9/2013 | Raleigh et al. | |
| 2013/0238762 A1 | 9/2013 | Raleigh et al. | |

(56) References Cited

U.S. PATENT DOCUMENTS

| | | |
|---|---|---|
| 2013/0238777 A1 | 9/2013 | Raleigh et al. |
| 2013/0239194 A1 | 9/2013 | Raleigh |
| 2013/0246237 A1 | 9/2013 | Dyess et al. |
| 2013/0250768 A1 | 9/2013 | Raleigh |

OTHER PUBLICATIONS

Copeland et al.: "Modelling Multi-MNO Business for MVNOs in their Evolution to L TE, VoLTE Advanced Policy," Intelligence in Next Generation Networks (ICIN), Oct. 2011, pp. 295-300.

* cited by examiner

HYBRID NETWORK BASED METERING SERVER AND TRACKING CLIENT FOR WIRELESS SERVICES

CROSS-REFERENCE TO RELATED APPLICATIONS

This application is a continuation of U.S. application Ser. No. 15/488,783, filed Apr. 17, 2017, now U.S. Pat. No. 10,003,947, which is a continuation of U.S. application Ser. No. 14/955,881, filed Dec. 1, 2015, now U.S. Pat. No. 9,628,978, which is a continuation of U.S. application Ser. No. 14/457,583 filed on Aug. 12, 2014, now U.S. Pat. No. 9,204,281, which is a continuation of U.S. application Ser. No. 13/669,838 filed Nov. 6, 2012, now U.S. Pat. No. 8,805,323 which are all hereby incorporated by reference in their entirety for all purposes as if fully set forth herein.

BACKGROUND OF THE DISCLOSURE

1. Field of the Disclosure

This disclosure relates generally to a process and system for implementing a hybrid network based metering server and tracking client for wireless services. More particularly, the disclosure relates to a process and system for implementing a hybrid network based metering server and tracking client for provisioning wireless services to wireless devices having an open mobile operating system.

2. Related Art

Certain companies that provide postpaid wireless services, such as mobile phone service, can be wireless carriers or Mobile Network Operators (MNO) that maintain and control their own wireless networks. An MNO relies heavily on backend systems to address any provisional, billing, security and data issues that might threaten the health of their networks.

A Mobile Virtual Network Operator (MVNO) is a mobile operator that typically does not own its own frequency spectrum and typically does not have its own network infrastructure. Instead, MVNOs have business arrangements and contracts with third party wireless carriers to purchase usage of their networks (e.g., minutes of use, volume of data transfer, number of SMS messages, etc.) that the MVNOs in turn sell to their own subscribers.

Accordingly, because of the two different approaches to service, the MNOs and MVNOs each have different cellular metering models. The two main types of cellular metering models are switch based metering of subscription wireless services used by MNOs and handset based metering of subscription wireless services by MVNOs.

Switch Based Metering of Subscription Services

In a switch based metering of subscription wireless services, a carrier switch, interface, or similar structure, typically resides in a MNO cloud and usually performs billing, provisioning, and maintains rates, and charges for all subscribers in the carrier space. This solution is widely deployed and available. Each MNO may implement one or more such interfaces across their network in order to deploy the service. The MVNO can interact with switch based metering. In this regard, the MVNO typically defines a subscription plan and uploads it for a user group. The switch can then typically notify the MVNO operator once the user has exhausted the plan.

Handset Based Metering of Subscription Services

In handset based metering of subscription services, the handset implements a secure model for metering, charging, and maintaining the subscription of wireless services. The handset maintains a software algorithm that typically meters and charges for each of the cellular subscriber's usage, and has some level of back-end control for provisioning and adding airtime to the line. The handset based metering is built on the assumption that usage metrics for the handset are not easily available to the MVNO operator from various MNOs. Moreover, usage metrics from the MVNO operator are not reliable from various MNOs. Additionally, the handset based metering typically relies on a secure phone that is not easily modified by the user.

The MVNO prepaid phones are typically strictly regulated in order to keep costs low and prepaid phone/rate offerings attractive. In an effort to diversify their revenue portfolio, MVNOs are now looking towards the use of more current handsets. In particular, as the cellular business evolves to providing more open mobile Operating System (OS) phones (i.e., Android, Symbian, Windows Mobile, iOS, and the like), a secure phone becomes difficult to maintain. A user may change a part, or a whole of the handset, without disturbing wireless service. A handset-based solution for metering thus becomes difficult to securely implement. Additionally, a wide variety of these handsets are available in the marketplace, and no mechanism exists to individually secure such devices for a handset based subscription service.

The switch based metering of subscription services is an MNO (carrier specific) implementation, with user notifications, billing, and metering of behavior tied to the switch provider. When an MVNO operator sets a subscription rate for a group of users subscribing to a plan, there is little to no flexibility to have campaigns/awards in order to provide a different behavior for the individual user. This reduces the flexibility for the MVNO. Additionally, the notifications, and other rate sensitive parameters are specific to each carrier, and their switch provider, thereby defeating the paradigm of a carrier agnostic experience to the MVNO customer.

The handset based metering of subscription services is a carrier agnostic model that relies on the handset maintaining a secure algorithm, such that the handset could meter and maintain various subscription parameters for the user. Additionally, this approach provides a way of instantly notifying the user of available balance, whether or not the wireless handset had service. This model relies on a secure memory based implementation in the handset, and additionally relies on pre-building a client into the handset. Handsets available in the marketplace with an open mobile OS provide no mechanism of securely retrofitting an application that enables this functionality.

Accordingly, there is a need for a Mobile Virtual Network Operator (MVNO) to be able to track and/or meter services used by subscribers having handsets with an open mobile Operating System (OS).

SUMMARY OF THE INVENTION

The foregoing needs are met, to a great extent, by the invention, with a process and system for implementing a hybrid network based metering server and tracking client for provisioning wireless services to wireless devices having open mobile operating systems. The term open mobile operating systems may apply to Android-based systems. Additionally, the term open mobile operating system described with respect to the invention applies to a mobile operating system that is "open" in reference to the system supporting APIs that allow third party developers to build applications.

In one or more aspects, a process of tracking usage of a wireless device in a third party wireless network with a metering system includes implementing the metering system in a network separate from the third party wireless network, activating the wireless device in response to identification of the wireless device and confirmation of use of a tracking system to the metering system, and obtaining, by the metering system, an amount of wireless services used by the wireless device, wherein the obtaining includes at least one of obtaining an amount of wireless services used from the third party wireless network and obtaining an amount of wireless services used from the tracking system.

In one or more aspects, a wireless network provider system configured to track usage of wireless services in a third party wireless network includes a metering system arranged in a network separate from the third party wireless network, the metering system configured to activate a wireless device in response to identification of the wireless device and confirmation of use of a tracking system to the metering system, and the metering system further configured to obtain an amount of wireless services used by the wireless device, wherein the obtaining includes at least one of obtaining an amount of wireless services used from the third party wireless network and obtaining an amount of wireless services used from the tracking system.

In one or more aspects, a system to track usage of a wireless device in a third party wireless network includes a tracking system to identify the wireless device to a metering system, the metering system implemented in a network separate from the third party wireless network, the tracking system further tracking usage of wireless services by the wireless device, and the tracking system reporting the usage of wireless services by the wireless device to the metering system.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Reference in this specification to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone." Further, reference in this specification to a "wireless network" or "network" is intended to encompass any type of wireless network from which a MVNO contracts with a MNO wireless carrier to provide mobile phone services through the use of a wireless device, such as the Global System for Mobile Communication (GSM) network, Code-Division Multiple Access (CDMA) network or the like, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
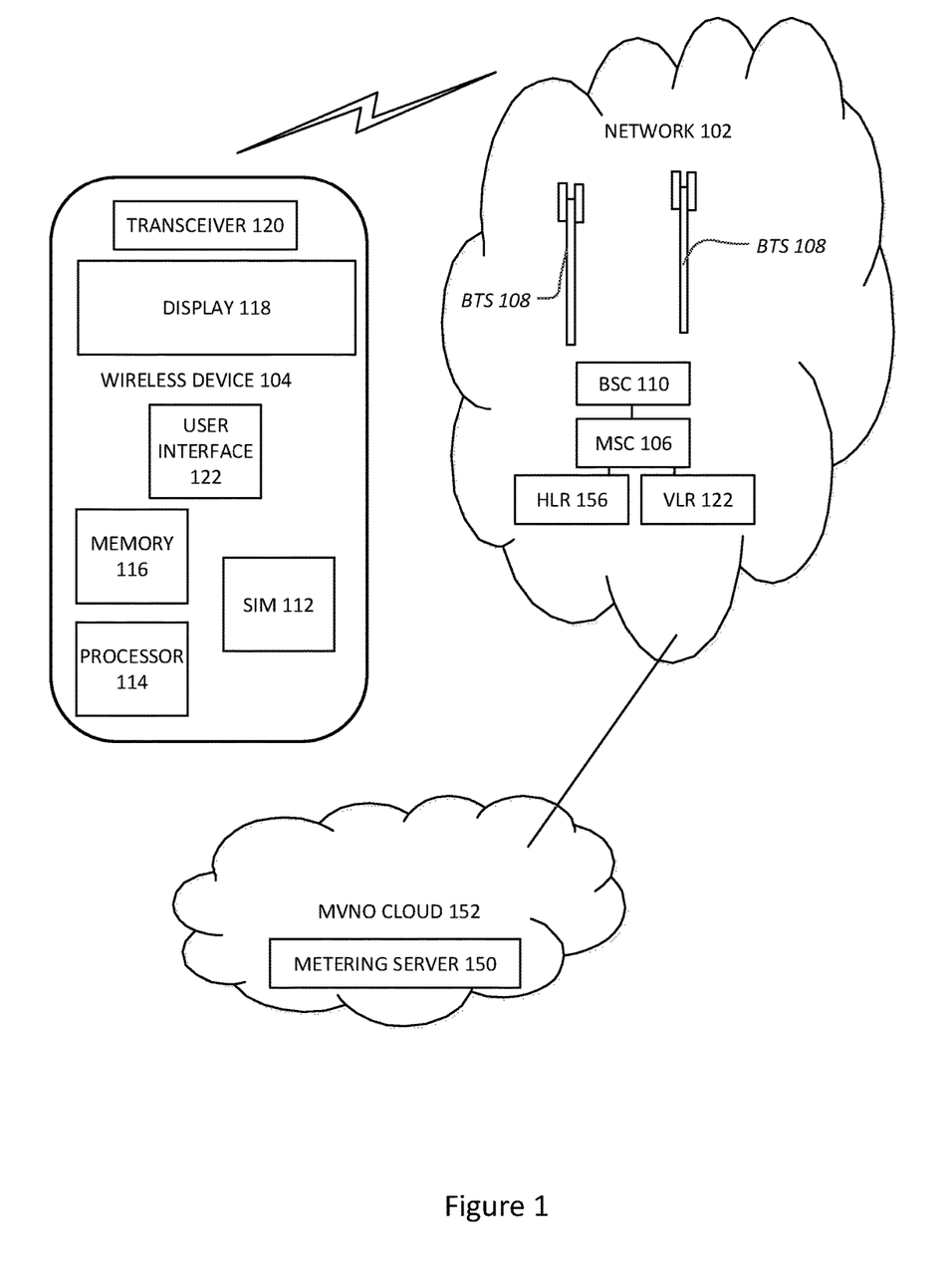
FIG. 1 shows the details of a mobile network, a wireless device, and a mobile virtual network operator in accordance with aspects of the invention.

The following acronyms used herein will be defined as follows:
BSC—Base Station Controller
BTS—Base Transceiver Station
CDMA—Code-Division Multiple Access
ESN—Electronic Serial Number
GSM—Global System for Mobile communication
HLR—Home Location Register
ICCID—Integrated Circuit Card Identification
IMEI—International Mobile Equipment Identity
IMSI—International Mobile Subscriber Identity
Ki—Authentication Key
LAI—Local Area Identity
LTE—Long Term Evolution
MSC—Mobile services Switching Center
MVNO—Mobile Virtual Network Operator
OTA—Over-The-Air
SMS—Short Message Service
UICC—Universal Integrated Circuit Card or SIM
UMTS—Universal Mobile Telecommunications Service
VLR—Visitor Location Register FIG. 1 shows the details of a mobile network, a wireless device, and a mobile virtual network operator in accordance with aspects of the invention. The invention uses a metering server 150 that may reside in a Mobile Virtual Network Operator (MVNO) cloud 152 or may stand-alone. The metering server 150 may be implemented as a server, computer, system, distributed processing system, cloud-based system or the like, or a plurality of the same. The MVNO cloud 152 may be implemented as a network, internet cloud, server, computer, system, distributed processing system, cloud-based system or the like. The metering server 150 may be responsible for one or more of provisioning, metering, and consolidating subscription information for the wireless subscribers of wireless devices such as wireless device 104. The metering server 150 may be configured to implement the further functionality as described in further detail below.

Additionally, a tracking client 154 is associated with the wireless device 104. The tracking client 154 may be pre-installed or post-installed on the wireless device 104. The tracking client 154 may track usage of the wireless device 104. Moreover, the tracking client 154 may report usage information to the metering server 150.

The wireless device 104 provides the radio and signal processing needed to access a network 102 for services. The wireless device 104 includes a processor 114, memory 116, display 118, transceiver 120, user interface 122, and the like as is known in the art. The processor 114 may be configured to process call functions, provide other services to the user, and may also execute any programs including the tracking client 154.

It should be noted that the tracking client 154 may also be stored on or execute, at least in part, on a Subscriber Identification Module (SIM) or Universal Integrated Circuit Card (UICC) (Hereinafter generically referred to as a SIM 112), on dedicated hardware including semiconductors, application specific integrated circuits (ASIC), programmable logic arrays, the processor 114, and other hardware devices. The tracking client 154 may also execute partially or completely on the network 102 and/or any other network including any form of cloud computing and the like. The tracking client 154 may also execute partially or completely in the MVNO cloud 152.

In arrangements that use a SIM 112, the SIM 112 may be associated with the wireless device 104. The SIM 112 may be an integrated circuit that stores information and/or data such as an International Mobile Subscriber Identity (IMSI) and also may store a key used to identify and authenticate subscribers on the wireless device 104 and other devices. The SIM 112 may be configured to be transferred between different wireless devices. SIM 112 may also store network-specific information used to authenticate and identify subscribers on the network 102.

FIG. 1 further shows that the network 102 may include a Mobile services Switching Center (MSC) 106 that may perform the switching of calls and that may include a Visitor Location Register (VLR) 124. The network 102 may also include a Base Transceiver Station (BTS) 108 and a Base Station Controller (BSC) 110. The base transceiver station 108 houses the radio transceivers that define a cell and handle the radio-link protocols with the wireless device 104. The base station controller 110 manages the radio resources for one or more base transceiver stations 108. The base station controller 110 is the connection between the wireless device 104 and the Mobile service Switching Center (MSC) 106.

A Home Location Register (HLR) 156 and the VLR 124 together with the MSC 106, provide the call-routing and roaming capabilities. The HLR 156 contains all the administrative information of each subscriber registered in the corresponding network 102, along with the current location of the wireless device 104.

Figure 2:
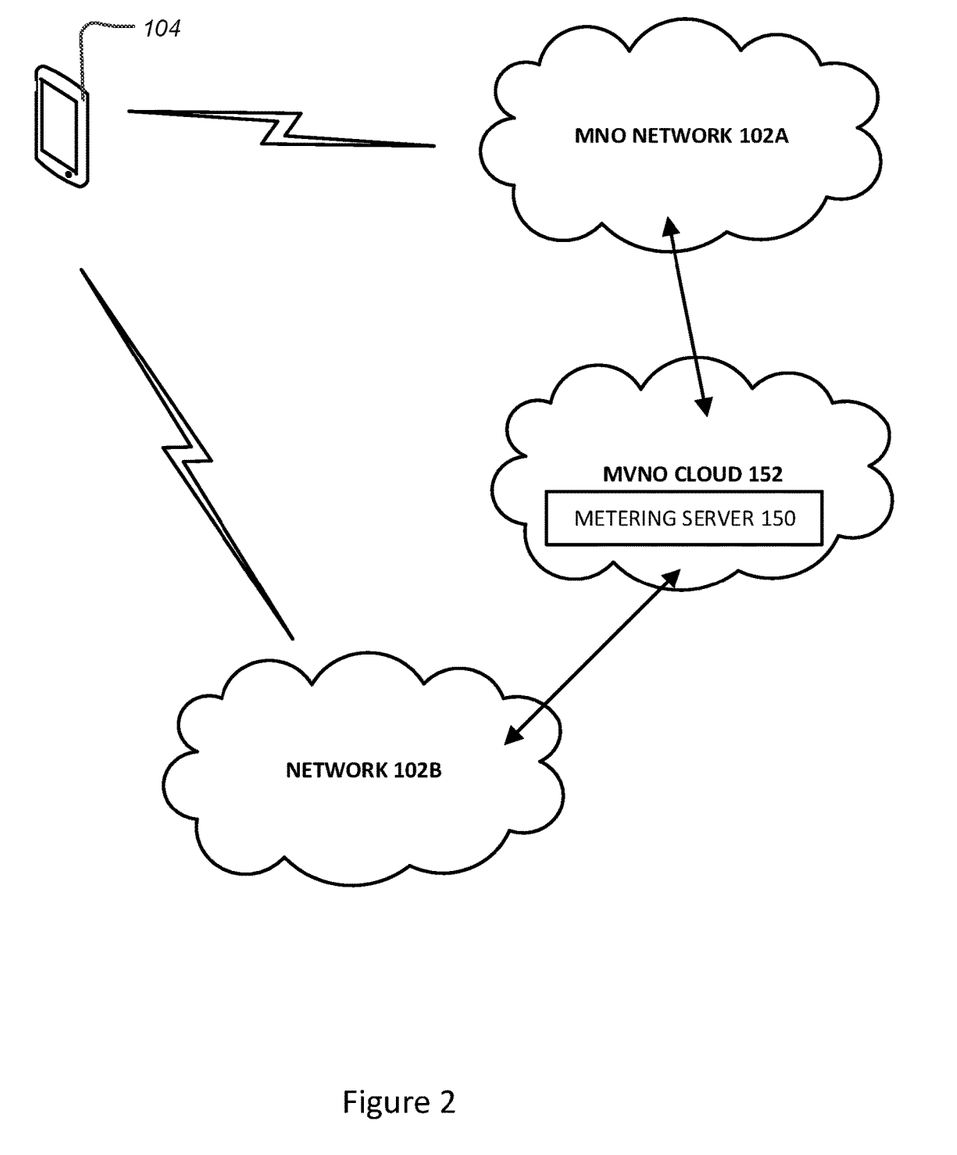
FIG. 2 shows connectivity between a plurality of mobile network operators, a wireless device, and a mobile virtual network operator in accordance with aspects of the invention.

FIG. 2 shows connectivity between a plurality of mobile network operators, a wireless device, and a mobile virtual network operator in accordance with aspects of the invention. In particular, FIG. 2 shows a wireless device 104 that may connect to a plurality of networks. The ability for wireless device 104 to connect to a plurality of networks is needed when implemented in the MVNO wireless model. This ability to connect to a plurality of networks provides the user of a MVNO wireless device to have a wireless carrier agnostic experience. For example, the wireless device 104 may connect to a first mobile network 102A or may connect to a second mobile network 102B to provide wireless services to the user of the wireless device 104. Each of the first mobile network 102A and second mobile network 102B may include structure and/or systems that are similar to those shown in the network 102 of FIG. 1 or the functional equivalent. Further shown in FIG. 2, the MVNO cloud 152 and metering server 150 are configured to have some level of connectivity or communication with all networks that a subscriber connects, such as first mobile network 102A and/or second mobile network 102B as described in detail below.

Figure 3:
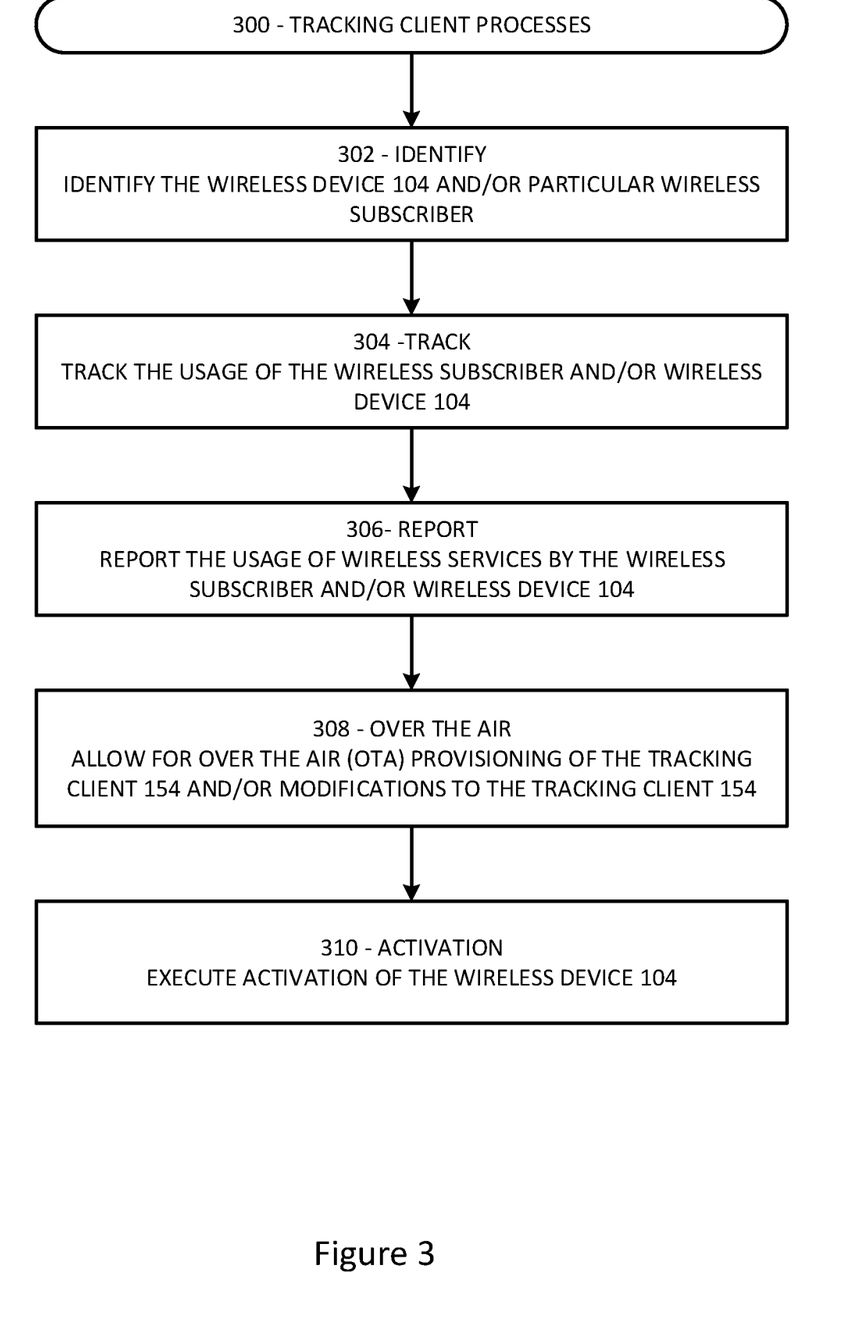
FIG. 3 shows tracking client processes in accordance with aspects of the invention.

FIG. 3 shows tracking client processes in accordance with aspects of the invention. As described above, the tracking client 154 may, in part, reside on the wireless device 104 or may be located elsewhere as noted above. In particular, the tracking client 154 may implement processes 300 to identify 302 the wireless device 104 and/or particular wireless subscriber; implement processes 300 and tracking process 304 to track the usage of the wireless subscriber and/or wireless device 104; implement processes 300 to report the usage of wireless services by the wireless subscriber using a reporting process 306 and/or wireless device 104; implement processes 300 to allow for over the air (OTA) provisioning 308 of the tracking client 154 and/or modifications to the tracking client 154; and implement processes 300 in order to execute an activation process 310 of the wireless device 104 to the network.

Identify

In a particular aspect of the tracking client 154, the tracking client 154 may identify 302 the particular wireless subscriber and/or the wireless device 104 by providing identification information of the particular wireless subscriber and/or the wireless device 104 as shown by the process 300 in FIG. 3. In particular, the information may include network-specific information as required by the network. Additionally, the tracking client 154 may provide the metering server 150 with specific information in order to provide the MVNO and/or the MVNO cloud 152 the ability to positively identify the wireless subscriber and/or wireless device 104. The network-specific information may include for example one or more of an Integrated Circuit Card Identification (ICCID), Electronic Serial Number (ESN), International Mobile Equipment Identity (IMEI), International Mobile Subscriber Identity (IMSI), Local Area Identity (LAI), and so on. Of course other types of information are within the spirit and scope of the invention.

In order to avoid compromising the network 102 and/or the subscription services, the identification information provided by the tracking client 154 may be stored in a secure location within the wireless device 104. Additionally, the identification information provided by the tracking client 154 may be encrypted to further avoid compromising the network 102 and/or the subscription services. Furthermore, the identification process 302 in which the tracking client 154 provides the identification information may also be based on a specific protocol. In particular, the protocol may include the identification information being provided by the tracking client 154 in response to a particular type of encoded request by the metering server 150, the identification information provided to the metering server 150 based on a timing protocol, and/or the identification information being provided based on a predetermined handshake process.

The information provided by the tracking client 154 may then be subsequently used by the metering server 150 to provide various functions of the metering system process shown in FIG. 4. For example, the tracking client 154 may communicate this identification information to the metering server 150 in order to activate a line, be able to subscribe to services, place a call, receive or send data, obtain services, send a text message, and/or otherwise receive wireless service.

Track

The tracking client 154 may also execute a tracking process 304 to track. In particular, the tracking client 154 may monitor the length of each voice call, the area code and/or the phone number that is placed based on the voice call, and the like. Additionally, the tracking client 154 may monitor the amount of data that is sent or received by the wireless device 104. Moreover, the tracking client 154 may monitor the number of SMS text messages or the like that are received or sent by wireless device 104. Furthermore, any other type of usage of the wireless device 104 may be tracked for purposes of maintaining the subscription wireless services. Additionally, for each of the above noted services provided to the wireless device 104, the further details of what network handled the services may also be tracked. Moreover, the date and time of the usage may be tracked as well. Finally, the tracking client 154 may also track any other aspect or usage of the wireless device 104 and accordingly these aspects are within the scope and spirit of the invention. This information or usage metric information that is accumulated based on the tracking of the above noted usage may then be stored in a secure location and/or stored in an encrypted manner to avoid the usage data from being compromised. Alternatively or additionally, the usage information may be stored in the MVNO cloud 152 or in the metering server 150. Alternatively or additionally, the usage information may be immediately reported to the MVNO cloud 152 in real time.

Additionally, the tracking process 304 may display the various metrics. For example, tracking process 304 may display the number of minutes of airtime used on the display 118 of the wireless device 104. Similarly, the tracking process 304 may also display the amount of data sent and received. Likewise the tracking process 304 may also display the amount of text messages sent and/or received. Moreover the tracking process 304 may provide a display of the amount of airtime, data, and/or text messages that may be remaining from the previously purchased and/or credited amount of airtime, data, and/or text messages. In other words, if a wireless user had purchased 100 min. of airtime and they used 70 min. of airtime, the tracking process 307 may display "30 min. of air time remaining." Additionally or alternatively, the tracking process 304 may display the current airtime, data, and/or text messages used and/or remaining in response to the usage process 404 of FIG. 4 from the metering server 150 as described in detail below.

Report

As shown in the reporting process 306, the tracking client 154 may communicate the usage information to the metering server 150. The communication of the usage information to the metering server 150 may take place at predetermined times, after predetermined amounts of usage, in an ad hoc manner, or the like. For example, the tracking client 154 may communicate in response to a request from the metering server 150. The tracking client 154 may communicate with the metering server 150 and/or MVNO cloud 152 across one or more mediums to convey usage metrics information. In one or more aspects, the tracking client 154 may be configured to send activity reports, such as by SMS messages or the like, to the metering server 150.

For example, the wireless device 104 may send a SMS text message providing the usage metric information of the wireless device 104 to the metering server 150. The wireless device 104 can also send the usage metric information via e-mail, packet form, datagram, USSD messages or the like. If the wireless device 104 has Wi-Fi capability, the reporting process 306 may wait until the wireless device 104 connects to a Wi-Fi hotspot to send the information over the Internet.

In one or more aspects, a reporting SMS message may be sent with one or more of the following pieces of information: the last accepted IMEI; the current IMEI; the ESN, the UICC ICC-ID; the length of each voice call, the total time of voice calls, the area code and/or the phone number that is placed based on the voice call; the amount of data that is sent and received; the total number of SMS text messages received and the total number of SMS text messages sent; and the date and time for each usage.

In one or more aspects, for such SMS reporting messages, the tracking client 154 may be configured to possess a destination address for the messages and a detail format (e.g., as provided by the MVNO or carrier) of the messages. In one aspect, the wireless device 104 SMS fields may be coded as a clear text ASCII comma separated value. The listing of parameters that may be reported may be stored securely in the wireless device 104 or on the SIM 112 (if utilized).

Over the Air Program

In one or more aspects, the tracking client 154 may include OTA programming functionality in the event the tracking client 154 needs to be updated via OTA programming. Furthermore, when provided, OTA based provisioning and updating may be secure with a specific access domain created for the MVNO based on the tracking client 154.

During a power-up on the wireless device 104, the tracking client may perform validation and/or a reporting process based on settings. The settings may be updated via a secure non-OTA programming method or may be updated using an OTA programming method. The tracking client may also be configured to receive OTA updates to refresh its programming and procedures. For example, the OTA updates may include initial tracking client setup, revised methods for sending activity reports, updated settings and the like.

Upon request, SMS reporting parameters, including the destination address and other parameters, can be modified at the time of SIM 112 card or UICC card personalization via a secure non-OTA programming method and they can be updated via OTA programming or non-OTA programming procedures. If the wireless device 104 does not utilize a SIM or UICC, then the tracking client 154 may also be configured to receive OTA updates to refresh its programming and procedures in an ad hoc manner.

The tracking client can also be configured to self-initiate a request for OTA programming updates to refresh its programming and procedures as necessary based on backend rules and procedures (e.g., initial tracking client setup, revised methods for sending activity reports, updated settings, etc.). The OTA provisioning may work independently of standard OTA platform functionality for the wireless device 104.

Activation

The tracking client 154 may communicate with the metering server 150 for activating a line (subscription) and the like. As further shown in the activation process 310, the tracking client 154 of the wireless device 104 may communicate with the metering server 150 in order to activate a phone, a line, a subscription, a modification in service, a new device, provisioning of wireless services, or the like. In this regard, activation process 310 may be implemented in conjunction with the identification process 302 in order for the metering server 150 to be able to confirm the subscriber. Once the identification process confirms that the wireless device 104 and/or subscriber is authentic and/or allowed to have access to the network for wireless services, then the provisioning may take place.

In this regard, the activation process 310 may include the metering server 150 and/or the MVNO cloud 152 communicating with the HLR 156 and/or a network provisioning server in order to provision wireless subscription services for the wireless user. Additionally, at the time of the activation process 310, other aspects and details of the tracking process 304, reporting process 306, and the OTA provisioning 308 may be set and provided to the tracking client 154. Moreover the execution of the activation of the wireless device 104 may be subject to a requirement that the tracking client 154 is resident, installed, enabled, and/or operating on the wireless device 104. In other words the lack of the tracking client 154 may result in limited or no activation and/or a provisioning of wireless services.

In one or more aspects, the metering server 150 may accept the wireless device 104 if all required wireless device verifications are successful. Otherwise, the metering server 150 may limit the capabilities of the wireless device. If the metering server 150 rejects the wireless device 104, the metering server 150 may display an error message or send a text message, such as "Handset rejected. Download tracking client." Such a process may ensure to a greater degree that the wireless device 104 is operating in conjunction with the tracking client 154. Additionally, if the user of the wireless device 104 deletes or uninstalls the tracking client 154, then the deletion or uninstalling of the tracking client 154 may result in the sending of a report that results in the deactivation of wireless services. Alternatively, the activation or provisioning of wireless services may be subject to verification that the tracking client 154 is installed and operating on the wireless device 104. Alternatively, verification of the tracking client 154 being installed and/or operating on wireless device 104 may take place at predetermined times, after predetermined actions, after predetermined amounts of usage, in an ad hoc manner, or the like.

Figure 4:
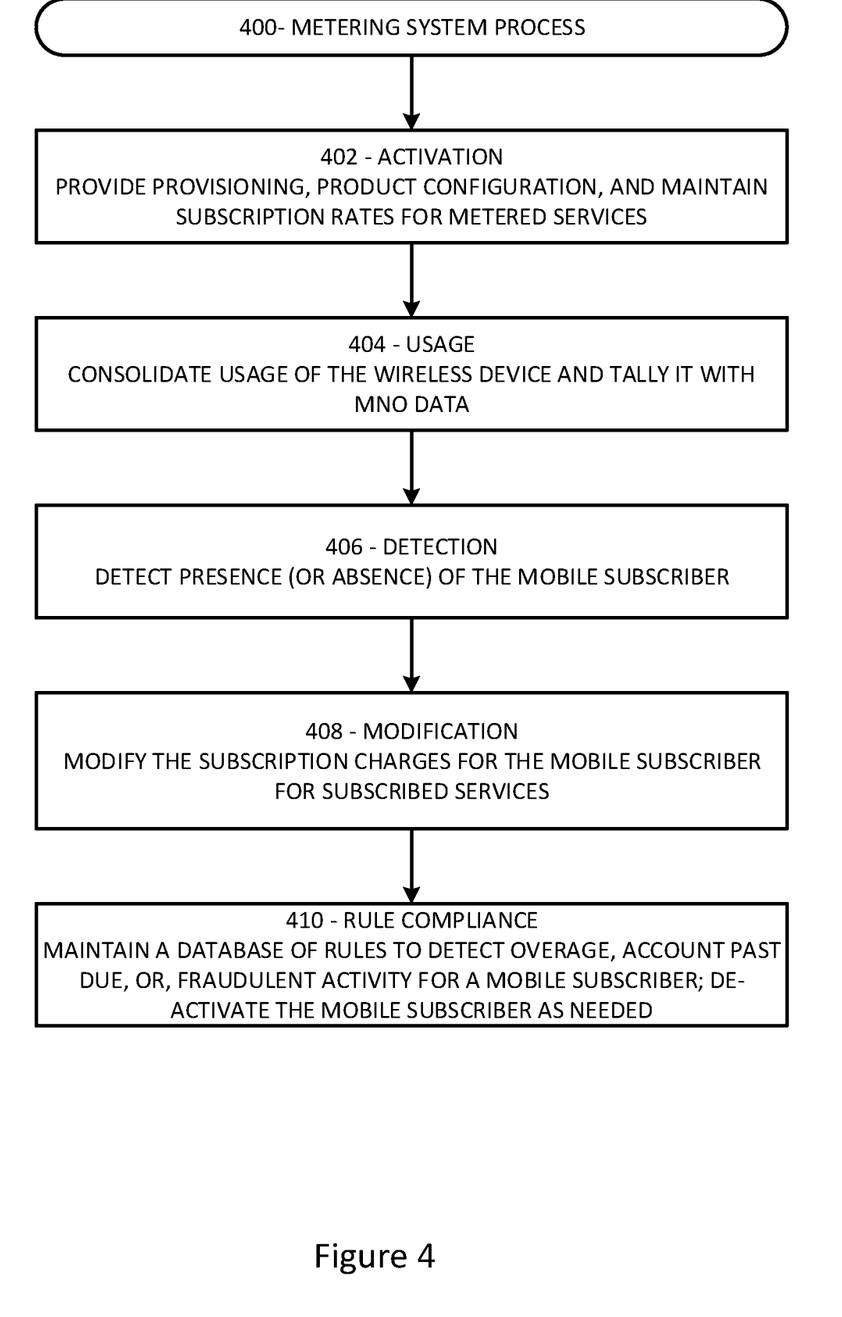
FIG. 4 shows metering system processes in accordance with aspects of the invention.

FIG. 4 shows metering system processes in accordance with aspects of the invention. In particular, the metering server 150 may execute activation processes 402; the metering server 150 may execute the usage process 404; the metering server may execute a detection process 406; the metering server 150 may execute a modification process 408; and the metering server 150 may execute rule compliance processes.

The metering server 150 may execute the activation processes 402 as shown in FIG. 4. In particular, the metering server 150 may activate the mobile subscriber on the carrier network, provide product configuration to the mobile subscriber, and maintain subscription rates for metered services. The activation processes 402 may operate in conjunction with the activation process 310 shown in FIG. 3 and described above, or instead of the activation process 310. Similar to the activation process 310, activation processes 402 may be subject to the installation and operation of the tracking client 154. Additionally, the metering server 150 may ensure that the wireless device 104 is properly configured for use with respect to a particular network 102. Of course, other types of configuration processes are also contemplated in conjunction with the activation step.

In a particular example, the metering server 150 residing on the MVNO cloud 152 may interface with the HLR 156 of a network 102 as shown in FIG. 2. However, the metering server 150 may interface with any aspect of the network 102 to provide the provisioning information to the network 102 and/or receive information regarding usage of wireless device 104 from the network 102. More specifically, the metering server 150 may interface with the network 102 such as with the HLR 156, or a suitable provisioning server, in order to activate, de-activate, or otherwise control the provisioning of a mobile subscriber.

Additionally, the activation processes 402 of the metering system process 400 may provide product configuration to the mobile subscriber and/or the wireless device 104. In particular, the activation processes 402 may exchange data with the wireless device 104 including ESN, IMEI, and the like. Additionally other wireless services can be configured including voicemail and the like.

Moreover, the activation processes 402 of the metering system process 400 may maintain subscription rates for metered services. For example, the rates for voice calls, data services, text messages, and the like. The activation processes 402 may also allow a wireless user to select a particular wireless service plan or product to be associated with their service.

The metering server 150 may execute the usage process 404. The metering server 150 may consolidate usage of the wireless device 104, and tally the usage with carrier data either in real time, or in an ad-hoc basis.

In a first aspect, the metering server 150 interfaces with the carrier's database to subscribe to usage statistics. For example, the metering server 150 may obtain usage statistics such as minutes of airtime, data usage, number of text messages sent and received and the like. In the case of a MVNO, the metering server 150 may interface with a plurality of networks such as shown in FIG. 2. If a wireless device 104 is provisioned the wireless service from one or more of the networks 102A and 102B, the metering server 150 may consolidate the usage metrics from these various networks. It should be noted that although two networks are shown in FIG. 2, any number of networks could provision wireless services to the wireless device 104. Accordingly, the metering server 150 may be able to consolidate usage statistics for each of these networks.

The metering server may execute the detection process 406. In particular, the metering server 150 may detect the presence (or absence thereof) of the mobile subscriber and/or wireless device 104, while consolidating usage to subscribed wireless services. In this regard, the detection process 406 may determine whether or not the mobile subscriber and/or wireless device 104 is currently operating within the wireless network in response to the identification process 302 shown in FIG. 3 and described above and/or a similar process. In this regard, the detection process 406 may include the ability for the wireless subscriber and/or wireless device 104 to provide identification. The metering server 150 may execute the detection process 406 whenever the tracking client 154 identifies itself in response to the identification process 302, may actively seek out the absence or presence of the wireless subscriber on a continuous basis, or the like. Alternatively, the detection process 406 may take place at predetermined times, during predetermined events, and/or in an ad hoc manner. The metering server 150 may maintain a database of the detection events of the wireless subscriber and/or wireless device 104 to ensure there is no fraudulent use.

The metering server 150 may execute the modification process 408. In particular, the metering server 150 may have the ability to modify the subscription charges for the mobile subscriber for subscribed services. The metering server 150 may execute the usage process 404 described above with respect to FIG. 4. Thereafter, the modification process 408 may modify any databases associated with respect to the wireless network and/or wireless user to ensure the correct charges for airtime, data, and or text messages are stored in the databases. For example, the modification process 408 may determine that more airtime was used in the wireless device 104 then is shown in the memory 116 of the wireless device 104. In this case, the modification process 408 may modify the airtime used and/or airtime remaining that is stored in the wireless device 104. The modification process 408 may be applied to data usage, text message usage, and any other usage desired. This ensures proper accounting of the airtime, data, and/or text message usage. On the other hand, should the wireless device 104 and tracking client 154 indicate that based on the tracking process 304 and reporting process 306 that additional airtime, data, and/or text messages were used than as indicated through the usage process 404, the metering system process 400 can update its database to ensure that there is a proper accounting of the airtime, data, and/or text message usage.

The metering server 150 may execute a rule compliance process 410. In particular, the metering server 150 may maintain a database of rules to detect overage, account past due, fraudulent activity and the like for a mobile subscriber. In response to such activities, the metering server 150 may have mechanisms to de-activate the mobile subscriber as needed. More specifically, the metering server 150 may include a database to store the amounts of usage of wireless services that are obtained in the tracking process 304 shown in FIG. 3 and described above, the reporting process 306 shown in FIG. 3 and described above and/or the usage process 404 shown in FIG. 4 described above. These stored values may then be compared to the amount of air time remaining, data remaining, subscription days remaining, and the like to ensure that the mobile subscriber has sufficient airtime credit, data credit, subscription day credit or the like in order to cover the services requested. The rule compliance process 410 works for both overage avoidance and past due processes. The rules associated with the rule compliance process 410 may be stored in metering server 150 and may be changed from time to time as desired by the MVNO. The particular rules can address any number of factors, and the responsive activities can address numerous different actions.

Similarly, the rule compliance process 410 may also use the identification process 302 shown in FIG. 3 described above and/or the detection process 406 shown in FIG. 4 described above to determine whether or not a particular wireless subscriber is fraudulently obtaining wireless services. In either case, the rule compliance process 410 may take the appropriate steps to limit access to the wireless network, send SMS messages to the wireless user regarding the potential overage, past due, and/or fraudulent access to the wireless account, and/or deactivate the wireless services to the user and/or the wireless device 104. The factors that indicate fraudulent access can include any number of actions and the response to such fraudulent access can include a number of responses as well.

As described above, the invention provides a Mobile Virtual Network Operator (MVNO) the ability to provide subscribers with greater choice of services and devices including devices that have open mobile operating systems. This approach is an improvement over prior approaches because it overcomes the shortcomings of the previous solutions by providing a carrier agnostic user experience to the MVNO customers that want to use phones with open mobile operating systems; and allowing for a post load of a tracking client 154 installable on phones with open mobile operating system to allow for a MVNO metering solution.

For the purposes of this disclosure a computer readable medium stores computer data, which data can include computer program code that is executable by a processor of the SIM or mobile device, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), 4G-LTE, Wireless Fidelity (Wi-Fi), Bluetooth, and/or the like, and/or a combination of two or more thereof.

In an embodiment, the invention may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various embodiments of the invention, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A process of tracking usage of a wireless device in a wireless network with a metering system comprising:
   implementing the metering system in a network separate from the wireless network;
   receiving with the metering system identification information from the wireless device implementing a tracking client;
   receiving usage statistics with the metering system from the tracking client implemented in the wireless device;
   receiving with the metering system an amount of wireless services used by the wireless device determined by the wireless network; and
   comparing with the metering system the amount of wireless services used by the wireless device determined by the wireless network to the amount of wireless services used by the wireless device received from the tracking client of the wireless device; and
   controlling with the metering system access to the wireless network for the wireless device based in response to the amount of wireless services used by the wireless device.

2. The process of tracking usage of a wireless device according to claim 1 further comprising receiving with the metering system a confirmation of use of the tracking client from the wireless device.

3. The process of tracking usage of a wireless device according to claim 1 further comprising implementing with the metering system over the air modification of the tracking client implemented in the wireless device.

4. The process of tracking usage of a wireless device according to claim 1 further comprising controlling with the metering system a wireless network access for the wireless device based in response to a confirmation of use of the tracking client from the wireless device.

5. The process of tracking usage of a wireless device according to claim 1 further comprising deactivating wireless service for the wireless device when there has been wireless service usage overage.

6. The process of tracking usage of a wireless device according to claim 1 wherein the wireless services comprise at least one of voice call usage, data usage, and text message usage.

7. The process of tracking usage of a wireless device according to claim 1 wherein the wireless device comprises an open mobile operating system.

8. The process of tracking usage of a wireless device according to claim 1 further comprising deactivating wireless service for the wireless device when there has been wireless service usage overage, a past due account status, or fraudulent activity.

9. The process of tracking usage of a wireless device according to claim 1 further comprising:
   receiving with the metering system a confirmation of use of the tracking client from the wireless device;
   receiving with the metering system an amount of wireless services used by the wireless device from the tracking client of the wireless device; and
   controlling with the metering system a wireless network access for the wireless device based in response to the confirmation of use of the tracking client from the wireless device.

10. The process of tracking usage of a wireless device according to claim 1 further comprising:
    deactivating wireless service for the wireless device when there has been wireless service usage overage, a past due account status, or fraudulent activity,
    wherein the wireless device comprises an open mobile operating system.

11. A system configured to track usage of a wireless device in a wireless network comprising:
    a metering server configured to be implemented in a network separate from the wireless network;
    the metering server configured to receive identification information from the wireless device implementing a tracking client;
    the metering server is further configured to receive usage statistics from the tracking client implemented in the wireless device;
    the metering server is further configured to receive an amount of wireless services used by the wireless device determined by the wireless network;
    the metering server is further configured to compare the amount of wireless services used by the wireless device determined by the wireless network to the amount of wireless services used by the wireless device received from the tracking client of the wireless device; and
    the metering server configured to control access to the wireless network for the wireless device based in response to the amount of wireless services used by the wireless device.

12. The system configured to track usage of a wireless device in a wireless network according to claim 11 wherein the metering server configured to receive a confirmation of use of the tracking client from the wireless device.

13. The system configured to track usage of a wireless device in a wireless network according to claim 11 wherein the metering server is further configured to implement over the air modification of the tracking client implemented in the wireless device.

14. The system configured to track usage of a wireless device in a wireless network according to claim 11 wherein the metering server configured to control a wireless network access for the wireless device based in response to a confirmation of use of the tracking client from the wireless device.

15. The system configured to track usage of a wireless device in a wireless network according to claim 11 wherein the metering server is further configured to deactivate wireless service for the wireless device when there has been wireless service usage overage.

16. The system configured to track usage of a wireless device in a wireless network according to claim 11 wherein the wireless services comprise at least one of voice call usage, data usage, and text message usage.

17. The system configured to track usage of a wireless device in a wireless network according to claim 11 wherein the wireless device comprises an open mobile operating system.

18. The system configured to track usage of a wireless device in a wireless network according to claim 11 wherein the metering server is further configured to deactivate wireless service for the wireless device when there has been wireless service usage overage, a past due account status, or fraudulent activity.

19. The system configured to track usage of a wireless device in a wireless network according to claim 11 wherein:

the metering server configured to receive a confirmation of use of the tracking client from the wireless device;

the metering server configured to receive an amount of wireless services used by the wireless device from the tracking client of the wireless device; and the metering server configured to control a wireless network access for the wireless device based in response to the confirmation of use of the tracking client from the wireless device.

20. The system configured to track usage of a wireless device in a wireless network according to claim 11 wherein:

the metering server is further configured to receive the usage statistics from the tracking client implemented in the wireless device; and the metering server is further configured to deactivate wireless service for the wireless device when there has been wireless service usage overage, a past due account status, or fraudulent activity, wherein the wireless device comprises an open mobile operating system.

* * * * *